United States Patent [19]

Himeno et al.

[11] Patent Number: 5,323,275
[45] Date of Patent: Jun. 21, 1994

[54] DIGITAL SIGNAL RECORDING AND/OR REPRODUCING APPARATUS HAVING CORRELATED DIGITAL AND ANALOG SIGNAL LEVEL CONTROLLERS

[75] Inventors: Takuji Himeno, Chiba; Kissei Matsumoto, Kanagawa, both of Japan

[73] Assignee: Sony Corporation, Tokyo, Japan

[21] Appl. No.: 827,416

[22] Filed: Jan. 29, 1992

[30] Foreign Application Priority Data

Jan. 31, 1991 [JP] Japan .................................. 3-032076
Jan. 31, 1991 [JP] Japan .................................. 3-032077

[51] Int. Cl.$^5$ .......................... G11B 5/00; G11B 5/09; H03G 3/00
[52] U.S. Cl. ...................... 360/32; 381/104; 381/107
[58] Field of Search ...................... 360/32, 62, 65, 68; 381/104, 107

[56] References Cited

U.S. PATENT DOCUMENTS

| | | | |
|---|---|---|---|
| 4,745,298 | 5/1988 | Kwamatsu | 307/38 |
| 5,097,364 | 5/1992 | Goto et al. | 360/32 |
| 5,146,370 | 9/1992 | Endo et al. | 360/32 |
| 5,157,557 | 10/1992 | Oohashi et al. | 360/32 |

FOREIGN PATENT DOCUMENTS

| | | |
|---|---|---|
| 151468 | 8/1985 | European Pat. Off. . |
| 332777 | 9/1989 | European Pat. Off. . |
| 292409 | 12/1986 | Japan .................................. 381/104 |
| 260412 | 11/1987 | Japan .................................. 381/104 |
| 62169313 | 1/1989 | Japan . |
| 63167201 | 1/1990 | Japan . |

Primary Examiner—Donald Hajec
Assistant Examiner—T. N. Forbus, Jr.
Attorney, Agent, or Firm—Lewis H. Eslinger; Jay H. Maioli

[57] ABSTRACT

A digital signal recording and/or reproducing apparatus which converts an input analog signal into a digital signal and records the digital signal on a recording medium, or which reproduces a digital signal recorded on a recording medium and converts the digital signal into an analog signal has an analog signal level controller and a digital signal level controller connected in front of and after an A/D converter or a D/A converter and the digital signal level controller and the analog signal level controller are controlled in correlation with each other, whereby the S/N ratio of a recording signal or a reproducing signal can be improved.

14 Claims, 3 Drawing Sheets

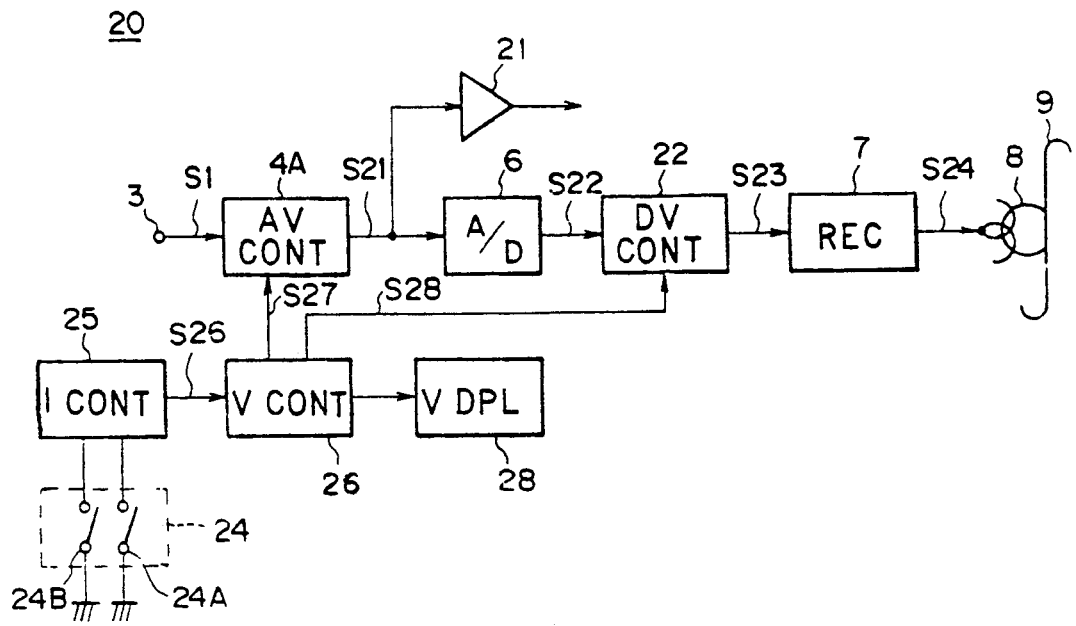
FIG.3
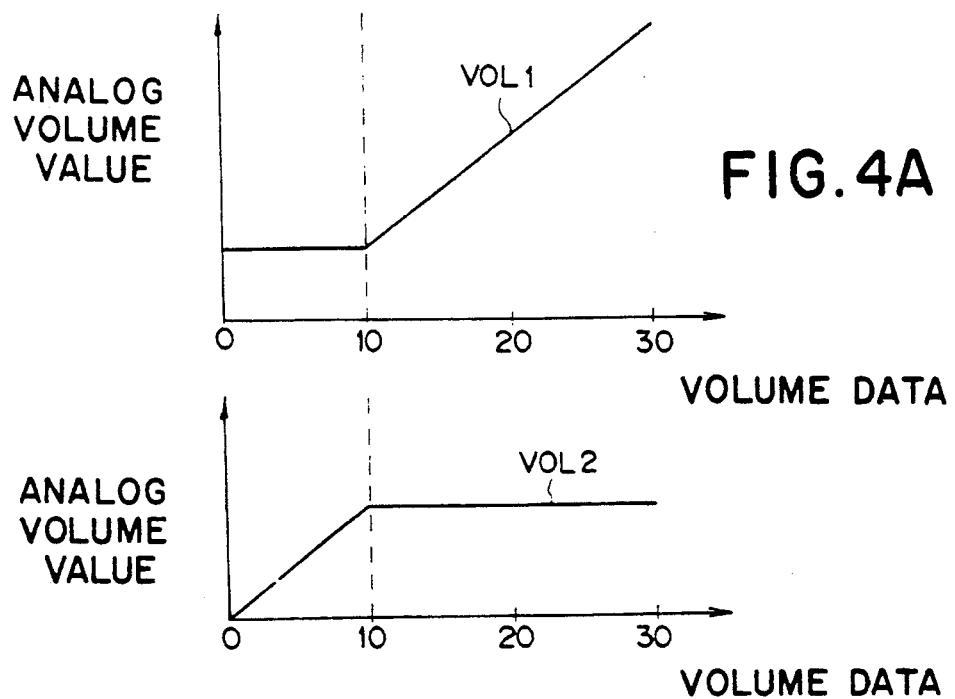
FIG.4A
FIG.4B

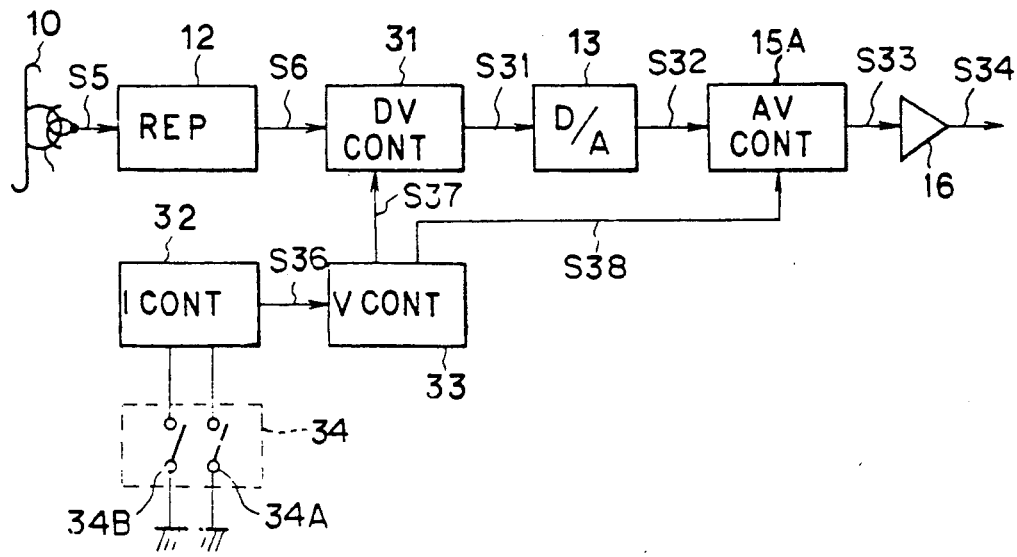
FIG.5
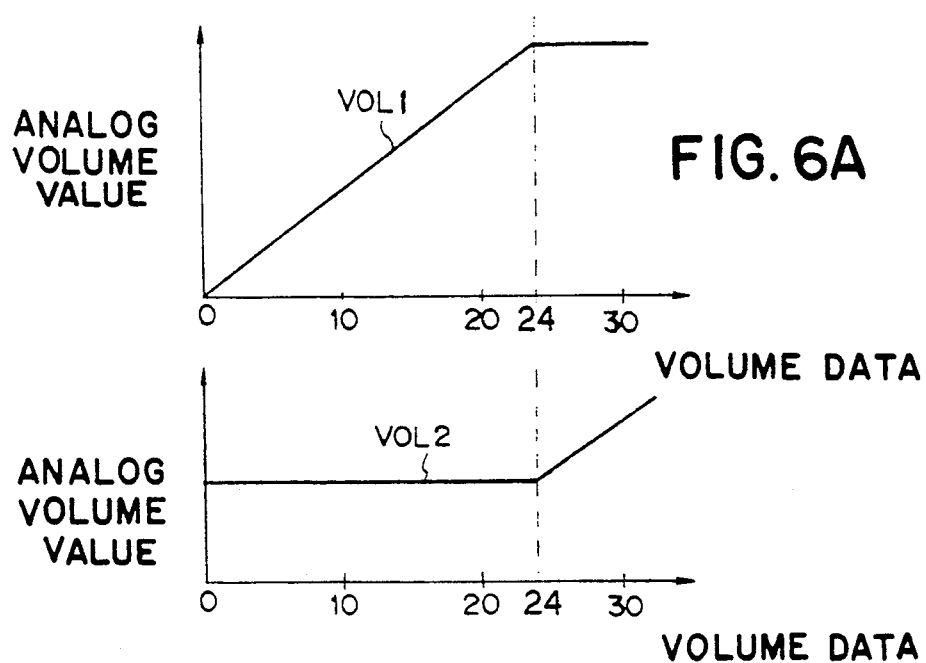
FIG.6A
FIG.6B

DIGITAL SIGNAL RECORDING AND/OR REPRODUCING APPARATUS HAVING CORRELATED DIGITAL AND ANALOG SIGNAL LEVEL CONTROLLERS

BACKGROUND OF THE INVENTION

A well-known type of signal recording and/or reproducing apparatus, for example, a digital audio tape recorder (DAT) using a rotary head, converts an analog signal into a digital signal and records the digital signal on a recording medium, such as a magnetic tape, and reproduces the digital signal recorded on the recording medium and converts and outputs the digital signal into an analog signal.

Such an apparatus adjusts an analog signal like an audio signal to a certain signal level through an analog volume control circuit, converts the adjusted analog signal into a digital signal, and then records the digital signal on a magnetic tape.

Furthermore, in order to reproduce the digital signal recorded on the magnetic tape, the signal reproduced from the magnetic tape is converted into an analog signal, adjusted to a certain signal level through the analog volume control circuit and then jed out.

FIG. 1 shows the construction of a signal recording system 1 of a conventional digital signal recording and/or reproducing apparatus. An analog audio signal S1 supplied from a microphone or an external device is input to a line input terminal 3. The analog audio signal S1 input to the line input terminal 3 is supplied to an analog volume control circuit so as to be adjusted to a volume value required by an analog-digital conversion circuit 6 that receives the signal through an amplifying circuit 5.

The analog-digital conversion circuit 6 converts the analog audio signal into a digital audio signal S3. The digital audio signal S3 is output to a recording circuit 7, modulated to a certain recording signal S4, and recorded on a magnetic tape 9 through a magnetic head 8.

FIG. 2 shows the construction of a signal reproducing system 2 of the conventional digital signal recording and/or reproducing apparatus. A digital signal recorded on a magnetic tape 10 is read out by a magnetic head 11, and supplied as a reproduction signal S5 to a reproducing circuit 12.

The reproducing circuit 12 demodulates the reproduction signal S5 to a digital audio signal S6. The digital signal S6 is converted into an analog audio signal S7 by a digital-analog conversion circuit 13, and supplied through an amplifying circuit 14 to an analog volume control circuit 15, which has, for example, a variable resistor and controls the volume by changing the variable resistor.

The analog volume control circuit 15 adjusts the analog audio signal S7 to a volume value desired by the user. A signal S8 output from the analog volume control circuit 15 is amplified by an amplifying circuit 16, and output as an audio signal S9.

However, if the analog audio signal is output through the amplifying circuit 5 and the analog-digital conversion circuit 6 after being set at a volume value desired by the user in the analog volume control circuit 4 shown in FIG. 1, noise components which signal processing circuits of the amplifying circuit 5, the analog-digital conversion circuit 6 and so on naturally contain are superimposed on the input signal S1 and are recorded as the recording signal S4. Thereby, the S/N ratio is lowered when the volume value is made small.

When an audio signal output from the analog volume control circuit 4 is monitored in recording, if a recording volume value is gradually decreased in, for example, a fade-out operation, since a monitor value is decreased with the decrease in the volume value, the input signal cannot be sufficiently monitored.

Furthermore, when an analog audio signal obtained through the digital-analog conversion circuit 13 and the amplifying circuit 14 shown in FIG. 2 is set at a volume value desired by the user in the analog volume control circuit 15 and then jed out, noise components arising from signal processing circuits of the digital-analog conversion circuit 13, the amplifying circuit 14 and so on are superimposed on the output audio signal S8. Therefore, when an audio signal recorded on a particularly low volume level is reproduced while the set volume value of the analog volume control circuit 15 is increased, since noise components arising from signal processing circuits of the digital-analog conversion circuit 13, the amplifying circuit 14 and so on are amplified together with the audio signal, the S/N ratio of the output audio signal S8 is lowered.

SUMMARY OF THE INVENTION

In view of the foregoing, an object of the present invention is to provide a digital signal recording and/or reproducing apparatus which converts an analog signal into a digital signal, records the digital signal on a recording medium, such as a magnetic tape or an optical disk, and/or reproduces a digital signal recorded on a recording medium, converts the digital signal into an analog signal, and outputs the analog signal, and in which apparatus the S/N ratio of a recording signal is not lowered and an input signal can be monitored on a certain volume even if a signal recording level is lowered by a recording signal level control means during signal recording.

In order to achieve the above object, there is provided a digital signal recording and/or reproducing apparatus which adjusts an input analog signal to a desired signal level by an analog signal level control means, converts the input analog signal into a digital signal by an analog-digital conversion means, and which comprises a digital signal level control means disposed between the analog-digital conversion means and a recording means for adjusting the signal level of the digital signal to a desired signal level related to the signal level adjusted by the analog signal level control means in digital signal processing when the digital signal is recorded on a recording medium through the recording means.

For example, if a signal recording level set by the user is within a range lower than a certain level, a control level of an analog signal level control means is held on a certain level in order to adjust the signal recording level. Then, the signal level is adjusted by a digital signal level control means. In other words, the digital signal level control means mainly operates in accordance with the signal recording level within such a range set by the user. It is possible to prevent the S/N ratio from being lowered due to noises and minute signal outputs arising from the analog signal level control means itself by outputting an analog signal on a certain signal level. The noises from the analog signal level control means can be turned down together with the input signal in the digital signal level control means, and thus the S/N ratio of the recording signal can be further increased. In this case, a preferable gain of the digital signal level control means is less than 1.

Furthermore, a signal reproducing system for reproducing a digital signal recorded on a recording medium has the following construction. A reproducing system which converts a digital signal reproduced from a recording medium by a reproducing means into an analog signal by a digital-analog conversion means and then adjusts and outputs the analog signal to a certain signal level by an analog signal level control means, is provided with a digital signal level control means disposed between the reproducing means and the digital-analog conversion means for adjusting the signal level of the digital signal to a certain signal level.

If the signal reproducing level set by the user is more than a certain level, the signal level is adjusted by the digital signal level control means while holding the control level of the analog signal level control means at a certain level. Therefore, a reproduction signal can be obtained without increasing noises arising from analog signal processing circuits of the analog signal level control means and so on.

The nature, principle and utility of the invention will become more apparent from the following detailed description when read in conjunction with the accompanying drawings in which like parts are designated by like reference numerals or characters.

BRIEF DESCRIPTION OF THE DRAWINGS

FIG. 3 is a block diagram of a digital signal recording system of a digital signal recording and/or reproducing apparatus according to the present invention;

FIGS. 4(A) and 4(B) are graphs showing the signal recording level control characteristics of an analog volume control circuit and a digital volume control circuit in the digital signal recording system shown in FIG. 3;

FIG. 5 is a block diagram of a digital signal reproducing system of the digital signal recording and/or reproducing apparatus according to the present invention; and FIGS. 6 (A) and 6(B) are graphs showing the signal reproducing level control characteristics of an analog volume control circuit and a digital volume control circuit in the digital signal reproducing system shown in FIG. 5.

DESCRIPTION OF THE PREFERRED EMBODIMENT

Figure 1:
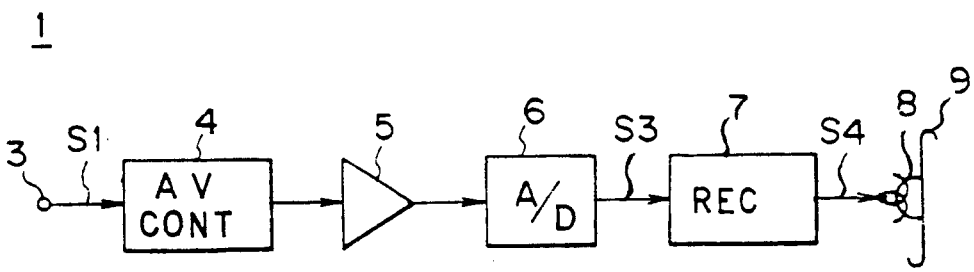
FIG. 1 is a block diagram of a digital signal recording system of a conventional digital signal recording and/or reproducing apparatus.

Preferred embodiments of this invention will be described with reference to the accompanying drawings:

Referring to FIG. 3 in which components corresponding to those shown in FIG. 1 are denoted by the same numerals, a signal recording system 20 of a DAT adjusts an audio signal S1 input from an audio signal input terminal 3 through a microphone or a line to a certain signal level based on volume data, described below, set by the user in an analog volume control circuit 4A. An output signal S21 from the analog volume control circuit 4A is transmitted to a monitor amplifying circuit 21 and an analog-digital conversion circuit 6.

The monitor amplifying circuit 21 amplifies the analog signal S21 output from the analog volume control circuit 4A to a certain signal level, and outputs the analog signal S21 to a monitor terminal (not shown), such as a head phone, thereby making it possible for the user to monitor the audio signal S21 output from the analog volume control circuit 4A.

The analog-digital conversion circuit 6 converts the analog signal S21 output from the analog volume control circuit 4A into a digital signal, and then transmits the digital signal as a digital audio signal S22 to a digital volume control circuit 22.

The digital volume control circuit 22 is composed of a digital multiplier having a gain less than, for example, unity, and adjusts a signal level of the digital audio signal S22 to a desired signal level by changing a signal level coefficient based on recording volume data set by the user. An output signal S23 output from the digital volume control circuit 22 is transmitted to a recording circuit 7, modulated to a recording signal S24, and recorded on a magnetic tape 9 through a recording head 8.

The analog volume control circuit 4A and the digital volume control circuit 22 control the analog audio signal S21 and the digital audio signal S22 to certain volume values, respectively, based on volume data set by the user's manipulation of a recording volume controller 24.

In other words, when a plus volume (increase) key 24A or a minus volume (decrease) key 24B of the recording volume controller 24 is operated, an input control circuit 25 receives a signal from the key 24A or 24B, and transmits a volume control signal S26 for increasing or decreasing the volume value to a volume control circuit 26.

The volume control circuit 26 displays a volume value set based on the volume control signal S26 in a volume display portion 28, transmits an analog volume control signal S27 to the analog volume control circuit 4A based on the volume control signal S26, and transmits a digital volume control signal S28 to the digital volume control circuit 22. In other words, the amplitude level of the digital audio signal S23 obtained through the analog volume control circuit 4A and the digital volume control circuit 22 is controlled in accordance with the volume value set by the user's manipulation of the recording volume controller 24.

FIGS. 4(A) and 4(B) show the signal level control characteristics of the analog volume control circuit 4A and the digital volume control circuit 22, respectively., In the analog volume control circuit 4A shown in FIG. 4(A), if the volume data set by the user is within a range of level from 0 to 10 (in this embodiment, the minimum volume data corresponding to the minimum volume value is at the level 0 and the maximum volume data corresponding to the maximum volume value is at the level 30), control is made to maintain a certain volume value. In short, even if the volume data changes, the output signal level from the analog volume control circuit 4A does not change. When the volume data is within a range of level from 10 to 30, the signal level is controlled so as to change proportionally to the volume data set by the user.

On the other hand, in the case of the digital volume control circuit 22 shown in FIG. 4(B), if the volume data set by the user is between the level 0 and the level 10, control is performed so that the output signal level of the digital volume control circuit 22 changes in accordance with the volume data. If the volume data is between the level 10 and the level 30, control is made so that a certain volume, for example, the maximum volume value is maintained, that is, the output signal level is constant.

Therefore, for example, if the user continuously increases a set volume value by operating the plus volume (increase) key 24A of the recording volume controller 24, when the volume data is between the level 0 and the level 10, the signal level of the output signal S21 from the analog volume control circuit 4A does not change since a set volume value VOL1 of the analog volume control circuit 4A is kept a certain value.

On the other hand, a set volume value VOL2 of the digital volume control circuit 22 gradually increases from the minimum volume value.

If the volume data is set within a range from the level 10 to the level 30, the set volume value VOL1 of the analog volume control circuit 4A sequentially increases in accordance with the volume data set by the user. The set volume value VOL2 of the digital volume control circuit 22 is kept a substantially constant value even if the volume data changes.

According to the above construction, when the recording volume value is within a relatively low range (from 0 to 12), the signal level of the digital volume control circuit 22 is controlled while the signal level of the analog volume control circuit 4A is kept constant. It is thereby possible to decrease the signal level value on the side of the digital volume control circuit 22 while keeping the value of the signal output from the analog volume control circuit 4A at a certain level other than 0 so as not to lower the S/N ratio. Therefore, the S/N ratio of the output signal S21 from the analog volume control circuit 4A can be prevented from being lowered, the noise components of analog circuit systems of the analog-digital conversion circuit 6 and so on disposed between the analog volume control circuit 4A and the digital volume control circuit 22 can be decreased together with the audio signal in the digital volume control circuit 22, and the S/N ratio can be further increased.

Since the level of the signal output from the analog volume control circuit 4A does not become less than a certain level, even if the level of the recording volume data is lowered to 0, the input signal can be monitored based on the signal S21 output from the analog volume control circuit 4A.

Therefore, the analog volume control circuit 4A in the former stage and the digital volume control circuit 22 in the latter stage are mounted, and the recording volume values of the analog volume control circuit 4A and the digital volume control circuit 22 are controlled in correlation with each other in accordance with the recording volume level set in a signal level control operation. If the recording signal level set by the user is below a certain signal level, the volume level can be controlled by the digital volume control circuit 22 while keeping the volume signal level of the analog volume control circuit 4A a certain level, a recording signal S24 in accordance with the volume value set by the user can be obtained, and the S/N ratio can be further increased.

Furthermore, since the level of the signal output from the analog volume control circuit. 4A is controlled not to be less than a certain level and the input signal can be monitored when the level of the recording volume data falls to the level 0, the state of the input voice can be monitored by headphones or the like even if the recording volume is gradually decreased to the level 0 in, for example, a fade-out operation As a result, convenience in using the apparatus can be further improved.

Although the set volume values of the analog volume control circuit 4A and the digital volume control circuit 22 are controlled as shown in FIG. 4 in accordance with the volume data set by the user in the above embodiment, the present invention is not limited to that embodiment. The essential thing is to substantially control the volume value on the side of the digital volume control circuit 22 when the signal level is controlled within a range lower than a certain signal level. Therefore, if the recording signal levels of both the volume control circuits are within a low range, it is only necessary to mainly operate the digital volume control circuit. The signal level control characteristics of the volume control circuits are not limited to ones shown in FIG. 4.

The analog volume control circuit 4A in the above embodiment may switch the gain of the amplifying circuit in response to the operation of the recording volume controller 24.

The construction of a signal reproducing system will be described in the following.

Figure 2:
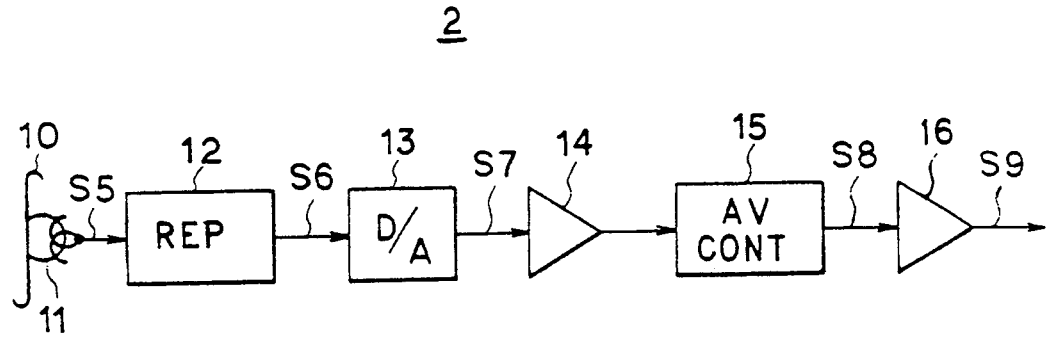
FIG. 2 is a block diagram of a digital signal reproducing system of the conventional digital signal recording and/or reproducing apparatus.

Referring to FIG. 5 in which components corresponding to those shown in FIG. 2 are denoted by the same numerals, a reproduction signal S5 output from a magnetic tape 10 through a magnetic head 11 is sent to a reproducing circuit 12 by a signal reproducing system 30 of a DAT, and a digital audio signal S6 is modulated and sent to a digital volume control circuit 31.

The digital volume control circuit 31 is composed of a multiplier having a gain more than unity whose coefficient is changed based on reproduction volume data set by the user. Therefore, it adjusts the level of the digital signal S6, and then sends a signal S31 output from the digital volume control circuit 31 to a digital-analog conversion circuit 13.

The digital-analog conversion circuit 13 obtains an analog signal S32 by converting the digital signal S31 output from the digital volume control circuit 31 into an analog signal, and transmits the analog signal S32 to an analog volume control circuit 15A, for example, which can adjust the signal level by controlling a variable resistor.

A volume value (that is, a signal level) of the analog audio signal S32 is adjusted by the analog volume control circuit 15A based on the reproduction volume data set by the user, described below. An output signal S33 from the analog volume control circuit 15A is amplified to a certain level through an amplifying circuit 16, and the amplified signal is output as an output signal S34.

The digital volume control circuit 31 and the analog volume control circuit 15A adjust the digital signal S6 and the analog signal S32 to respective certain levels based on the volume data set by the user's manipulation of a reproduction volume controller 34.

In other words, when a plus volume (increase) key 34A or a minus volume (decrease) key 34B of the reproduction volume controller 34 is operated, an input control circuit 32 transmits a volume control signal S36 for increasing or decreasing a signal level value to a volume control circuit 33.

The volume control circuit 33 transmits a digital volume control signal S37 to the digital volume control circuit 31 based on the volume control signal S36 and transmits an analog volume control signal S38 to the analog volume control circuit 15A, thereby adjusting the signal level of the analog signal S33 obtained through the digital volume control circuit 31 and the analog volume control circuit 15A to a signal level set by the user's manipulation of the reproduction volume controller 34.

As shown in FIG. 6(B), in the case of the digital volume control circuit 31, when volume data set by the user (in this embodiment, the minimum volume data corresponding to the minimum volume value is on the level 0 and the maximum volume data corresponding to the maximum volume value is on the level 30) is within a range from the level 0 to the level 24, a certain volume value is maintained. When the volume data is within a range from the level 24 to the level 30, the volume value is changed in accordance with the volume data.

On the other hand, in the analog volume control circuit 15A as shown in FIG. 6(A), when the volume data set by the user is within a range from the level 0 to the level 24, the volume value is controlled so as to change in accordance with the volume data. When the volume data is within a range from the level 24 to the level 30, the maximum volume value is maintained.

Therefore, for example, if the user continuously changes a set volume value by operating the plus volume (increase) key 34A of the recording volume controller 34, when the volume data is within a range from the level 0 to the level 24, a set volume value VOL2 of the digital volume control circuit 31 is kept a certain value and a set volume value VOL1 of the analog volume control circuit 15A is increased from the minimum volume value to a certain volume value.

At this time, if the volume data is within a range from the level 24 to the level 30, the set volume value VOL2 of the digital volume control circuit 31 is increased to a certain volume value in accordance with the volume data, and the set volume value VOL1 of the analog volume control circuit 15A is kept a certain volume value.

When the set volume value in the analog volume control circuit 15A is within a range where it continuously changes from the minimum value to a certain value (that is, the reproduction volume data set by the user is within a range from the level 0 to the level 24), the set volume value in the digital volume control circuit 31 is kept a certain non-zero value. Furthermore, if data of a level more than that of the reproduction volume data (level 24), where the set volume value in the analog volume control circuit 15A is constant, is set by the user, the set digital volume value of the digital volume control circuit 31 is increased while keeping the set volume of the analog volume control circuit 15A a certain value. Thereby, the analog volume control circuit 15A mainly controls the level of the audio signal S34 in accordance with the volume value set by the user in a range between the level 0 and a certain volume data (the level 24). In a volume data range higher than the certain volume data (the level 24), the digital volume control circuit 31 mainly controls the level of the signal S34 in accordance with the volume data set by the user.

In the above construction, if an audio signal is output at a volume value higher than a certain volume value capable of being set by the analog volume control circuit 15A, the signal reproducing system 30 of the DAT can widen a variable volume range of the output signal S34 by increasing the set volume value of the digital volume control circuit 31 while keeping the set volume value of the analog volume control circuit 15A a certain value, and can obtain the output signal S34 in accordance with the volume value set by the user without increasing the noise components in signal processing circuits of the digital-analog conversion circuit 13, the analog volume control circuit 15A and so on.

Therefore, for example, a voice recorded at a low level can be reproduced at a higher level by increasing the set volume value on the down stream side of the digital volume control circuit 31 while preventing the S/N ratio from being lowered.

The digital volume control circuit 31 has an overflow limiter, and can clip a signal having a sudden high level at a certain value.

According to the above construction, the digital volume control circuit 31 in the initial stage and the analog volume control circuit 15A in the latter stage are provided, and the reproduction volume values of the digital volume control circuit 31 and the analog volume control circuit 15A are controlled in correlation with each other in accordance with the reproduction volume level set by the user operating a volume control. If the reproduction volume level set by the user is higher than a certain value, the S/N ratio of the audio signal S34 can be prevented from being lowered by adjusting the volume level using the digital volume control circuit 31 while keeping the volume level of the analog volume control circuit 15A a certain level.

Although the set volume values of the digital volume control circuit 31 and the analog volume control circuit 15A are controlled as shown in FIGS. 6(A) and 6(B) in accordance with the volume data set by the user in the above embodiment, the present invention is not limited to that embodiment. It is only necessary to control the signal level on the side of the digital volume control circuit 31 when the level of the set volume data is more than a certain set value.

Furthermore, although the analog volume control circuit 15A in the above embodiment changes the signal level by using a variable resistor, it could also switch the gain of the amplifying circuit.

Although the present invention is applied to a digital audio tape recorder in the above embodiment, it is applicable to various kinds of digital audio recorders.

Still furthermore, although the present invention is applied to a recording and/or reproducing apparatus which records and/or reproduces audio signals in the above embodiment, the present invention is not limited to such an apparatus.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A digital signal recording apparatus for controlling a recording level in which an input analog signal is converted into a digital signal by an analog-digital convertor and is digitally recorded on a recording medium, comprising:

analog signal level control means for controlling a signal level of said input analog signal supplied to said analog-digital convertor;

digital signal level control means for digitally controlling a digital signal level of a digital signal output from said analog-digital convertor; and volume control means responsive to user input connected to said analog signal level control means and to said digital signal level control means for controlling the respective signal level controlling operations of said analog signal level control means and said digital signal level control means to be in correlation with each other, whereby when said volume control means is set by said user input to produce a volume below a predetermined value, said analog signal level control means will hold said signal level of said input analog signal supplied to said analog-digital converter substantially constant and said digital signal level control means will increase said digital signal level of said digital signal output from said analog-digital converter by an amount sufficient to yield a digital signal level substantially matching the volume level set by said user input, and whereby the signal to noise ratio of the digital signal after being controlled by the digital signal level control means is maximized.

2. The digital signal recording apparatus according to claim 1, wherein said volume control means includes means for causing a signal level of an input signal to be controlled by said digital signal level control means when a volume level set by said volume control means is below a predetermined level.

3. The digital signal recording apparatus according to claim 2, wherein said analog signal level control means maintains a fixed signal level over a predetermined range of volume controlled by said volume control means.

4. The digital signal recording apparatus according to claim 1, wherein said volume control means includes means for causing a signal level of an input signal to be controlled by said analog signal level control means when a volume level set by said volume control means is above a predetermined level.

5. The digital signal recording apparatus according to claim 4, wherein said digital signal level control means maintains a fixed signal level over a predetermined range of volume controlled by said volume control means.

6. The digital signal recording apparatus according to claim 1, wherein when a volume level set by an operator of the apparatus is below a predetermined volume level, said volume control means produces a first control signal for keeping an analog signal level a certain value supplied to said analog signal level control means and a second control signal in accordance with the volume level set by the operator supplied to said digital signal level control means for causing a digital signal level to substantially equal the volume level set by the operator.

7. The digital signal recording apparatus according to claim 1, wherein when a volume level set by an operator of the apparatus is above a predetermined volume level, said volume control means produces a first control signal for keeping a digital signal level a certain value supplied to said digital signal level control means and a second control signal in accordance with the volume level set by the operator supplied to said analog signal level control means for causing an analog signal level to substantially equal the volume level set by the operator.

8. A digital signal reproducing apparatus having a signal reproducing device for controlling a reproducing level in which a digital signal recorded on a recording medium is reproduced and converted in a digital-analog convertor into an analog signal, comprising:

digital signal level control means for digitally controlling a digital signal level of the reproduced digital signal supplied to said digital-analog convertor;

analog signal level control means for controlling a signal level of said analog signal output from said digital-analog convertor; and volume control means responsive to user input connected to said digital signal level control means and to said analog signal level control means for controlling the respective signal level controlling operations of said digital signal level control means and said analog signal level control means to be in correlation with each other, whereby when said volume control means is set by said user input to produce a volume below a predetermined value, said digital signal level control means will hold said signal level of said reproduced digital signal supplied to said digital-analog converter substantially constant and said analog signal level control means will increase said analog signal level of said analog signal output from said digital-analog converter by an amount sufficient to yield an analog signal level substantially matching the volume level set by said user input, and whereby the signal to noise ratio of the analog signal after being controlled by the analog signal level control means is maximized.

9. The digital signal reproducing apparatus according to claim 8, wherein said volume control means includes means for causing a signal level of a reproduced signal output from said signal reproducing device to be controlled by said analog level control means when a volume level set by said volume control means is below a predetermined level.

10. The digital signal reproducing apparatus according to claim 9, wherein said digital signal level control means maintains a fixed signal level over a predetermined range of volume controlled by said volume control means.

11. The digital signal reproducing apparatus according to claim 8, wherein said volume control means includes means for causing a signal level of a reproduced signal output from said signal reproducing device to be controlled by said digital signal level control means when a volume level set by said volume control means is above a predetermined level.

12. The digital signal reproducing apparatus according to claim 11, wherein said analog signal level control means maintains a fixed signal level over a predetermined range of volume controlled by said volume control means.

13. The digital signal reproducing apparatus according to claim 8, wherein when a volume level set by an operator of the apparatus is above a predetermined level, said volume control means produces a first control signal for keeping an analog signal level a ceratin value supplied to said analog signal level control means and a second control signal in accordance with the volume level set by the operator supplied to said digital signal level control means for causing a digital signal level to substantially equal the volume level set by the operator.

14. The digital signal reproducing apparatus according to claim 8, wherein when a volume level set by an operator of the apparatus is above a predetermined level, said volume control means produces a first control signal for keeping a digital signal level a certain value supplied to said digital signal level control means and a second control signal in accordance with the volume level set by the operator supplied to said analog signal level control means for causing an analog signal level to substantially equal the volume level set by the operator.

* * * * *